United States Patent [19]

Cohen et al.

[11] Patent Number: 5,524,169
[45] Date of Patent: Jun. 4, 1996

[54] METHOD AND SYSTEM FOR LOCATION-SPECIFIC SPEECH RECOGNITION

[75] Inventors: Paul S. Cohen, Yorktown Heights; John M. Lucassen, New York, both of N.Y.; Roger M. Miller, Brookfield; Elton B. Sherwin, Jr., Stamford, both of Conn.

[73] Assignee: International Business Machines Incorporated, Armonk, N.Y.

[21] Appl. No.: 175,701

[22] Filed: Dec. 30, 1993

[51] Int. Cl.[6] .................................................. G10L 5/06
[52] U.S. Cl. ........................ 395/2.4; 395/2.64; 395/2.79
[58] Field of Search ................................ 395/2.4, 2.52, 395/2.53, 2.61, 2.64, 2.86, 2.79; 364/424.01, 424.02

[56] References Cited

U.S. PATENT DOCUMENTS

| | | | |
|---|---|---|---|
| 4,525,793 | 6/1985 | Stackhouse | 395/2.79 |
| 4,620,286 | 10/1986 | Smith et al. | 395/77 |
| 4,769,845 | 9/1988 | Nakamura | 395/2.4 |
| 4,797,924 | 1/1989 | Schnars, et al. | 381/43 |
| 4,831,550 | 5/1989 | Katz | 395/2.49 |
| 4,852,173 | 7/1989 | Bahl et al. | 381/43 |
| 4,856,066 | 8/1989 | Lemelson | 381/36 |
| 4,866,778 | 9/1989 | Baker | 381/43 |
| 4,903,305 | 2/1990 | Gillick et al. | 395/2.54 |
| 4,914,703 | 4/1990 | Gillick | 395/2.54 |
| 4,964,167 | 10/1990 | Kunizawa et al. | 395/2.69 |
| 4,984,177 | 1/1991 | Rondel et al. | 395/2.86 |
| 4,984,178 | 1/1991 | Hemphill et al. | 395/2.64 |
| 4,994,983 | 2/1991 | Landell et al. | 395/2.54 |
| 5,003,490 | 3/1991 | Castelaz et al. | 395/22 |
| 5,005,203 | 4/1991 | Ney | 395/2.64 |
| 5,027,406 | 6/1991 | Roberts et al. | 395/2 |
| 5,033,087 | 7/1991 | Bahl et al. | 395/2.65 |
| 5,058,167 | 10/1991 | Kimura | 381/43 |
| 5,167,011 | 11/1992 | Priest | 395/54 |
| 5,175,794 | 12/1992 | Tattersall | 395/2 |
| 5,233,681 | 9/1993 | Bahl et al. | 395/2 |
| 5,274,695 | 12/1993 | Green | 379/88 |
| 5,297,183 | 3/1994 | Bareis et al. | 379/59 |
| 5,384,892 | 1/1995 | Strong | 395/2.52 |
| 5,406,492 | 4/1995 | Suzuki | 364/449 |

OTHER PUBLICATIONS

A. Burstein, et al., "Using Speech Recognition in a Personal Communications System," Supercomm/ICC '92: Discovering a New World of Communications, Jun., 1992 pp. 1717–1721 vol. 3.

*Primary Examiner*—Allen R. MacDonald
*Assistant Examiner*—Thomas J. Onka
*Attorney, Agent, or Firm*—Paul T. Kashimba; Martin J. McKinley; Andrew J. Dillon

[57] ABSTRACT

A method and system for reducing perplexity in a speech recognition system based upon determined geographic location. In a mobile speech recognition system which processes input frames of speech against stored templates representing speech, a core library of speech templates is created and stored representing a basic vocabulary of speech. Multiple location-specific libraries of speech templates are also created and stored, each library containing speech templates representing a specialized vocabulary for a specific geographic location. The geographic location of the mobile speech recognition system is then periodically determined utilizing a cellular telephone system, a geopositioning satellite system or other similar systems and a particular one of the location-specific libraries of speech templates is identified for the current location of the system. Input frames of speech are then processed against the combination of the core library and the particular location-specific library to greatly enhance the accuracy and efficiency of speech recognition by the system. Each location-specific library preferably includes speech templates representative of location place names, proper names, and business establishments within a specific geographic location.

10 Claims, 3 Drawing Sheets

METHOD AND SYSTEM FOR LOCATION-SPECIFIC SPEECH RECOGNITION

BACKGROUND OF THE INVENTION

1. Technical Field

The present invention relates in general to improved speech recognition systems and in particular to an improved method and system for enhanced speech recognition accuracy. Still more particularly, the present invention relates to a method and system for enhanced speech recognition in a mobile system utilizing location-specific libraries of speech templates and an identification of the system location.

2. Description of the Related Art

Speech recognition is well known in the prior art. The recognition of isolated words from a given vocabulary for a known speaker is perhaps the simplest type of speech recognition and this type of speech recognition has been known for some time. Words-within the vocabulary to be recognized are typically prestored as individual templates, each template representing the sound pattern for a word in the vocabulary. When an isolated word is spoken, the system merely compares the word to each individual template which represents the vocabulary. This technique is commonly referred to as whole-word template matching. Many successful speech recognition systems use this technique with dynamic programming to cope with nonlinear time scale variations between the spoken word and the prestored template.

Of greater difficulty is the recognition of continuous speech or speech which contains proper names or place names. Continuous speech, or connected words, have been recognized in the prior art utilizing multiple path dynamic programming. One example of such a system is proposed in "Two Level DP Matching A Dynamic Programming Based Pattern Matching Algorithm For Connected Word Recognition" H. Sakoe, IEEE Transactions on Acoustics Speech and Signal Processing, Volume ASSP-27, No. 6, pages 588–595, December 1979. This paper suggests a two-pass dynamic programming algorithm to find a sequence of word templates which best matches the whole input pattern. Each pass through the system generates a score which indicates the similarity between every template matched against every possible portion of the input pattern. In a second pass the score is then utilized to find the best sequence of templates corresponding to the whole input pattern.

U.S. Pat. No. 5,040,127 proposes a continuous speech recognition system which processes continuous speech by comparing input frames against prestored templates which represent speech and then creating links between records in a linked network for each template under consideration as a potentially recognized individual word. The linked records include ancestor and descendent link records which are stored as indexed data sets with each data set including a symbol representing a template, a sequence indicator representing the relative time the link record was stored and a pointer indicating a link record in the network from which it descends.

The recognition of proper names represents an increase in so-called "perplexity" for speech recognition systems and this difficulty has been recently recognized in U.S. Pat. No. 5,212,730. This patent performs name recognition utilizing text-derived recognition models for recognizing the spoken rendition of proper names which are susceptible to multiple pronunciations. A name recognition technique set forth within this patent involves entering the name-text into a text database which is accessed by designating the name-text and thereafter constructing a selected number of text-derived recognition models from the name-text wherein each text-derived recognition model represents at least one pronunciation of the name. Thereafter, for each attempted access to the text database by a spoken name input the text database is compared with the spoken name input to determine if a match may be accomplished.

U.S. Pat. No. 5,202,952 discloses a large-vocabulary continuous-speech prefiltering and processing system which recognizes speech by converting the utterances to frame data sets wherein each frame data set is smoothed to generate a smooth frame model over a predetermined number of frames. Clusters of word models which are acoustically similar over a succession of frame periods are designated as a resident vocabulary and a cluster score is then generated by the system which includes the likelihood of the smooth frames evaluated utilizing a probability model for the cluster against which the smoothed frame model is being compared.

Each of these systems recognizes that successful speech recognition requires a reduction in the perplexity of a continuous-speech utterance. Publications which address this problem are "Perplexity-A Measure of Difficulty of Speech Recognition Tasks," Journal of the Acoustical Society of America, Volume 62, Supplement No. 1, page S-63, Fall 1977, and the "Continuous Speech Recognition Statistical Methods" in the Handbook of Statistics Volume 2: Classification, Pattern Recognition and Reduction of Dimensionality, pages 549–573, North-Holland Publishing Company, 1982.

In view of the above, it should be apparent that successful speech recognition requires an enhanced ability to distinguish between large numbers of like sounding words, a problem which is particularly difficult with proper names, place names and numbers. It should therefore be apparent that a need exists for a method and system which enhances the accuracy and efficiency of speech recognition.

SUMMARY OF THE INVENTION

It is therefore one object of the present invention to provide an improved speech recognition system.

It is another object of the present invention to provide an improved method and system for enhanced speech recognition accuracy and efficiency.

It is yet another object of the present invention to provide an improved method and system for enhanced speech recognition in a mobile speech recognition system which utilizes location-specific libraries of speech templates and an identification of system location.

The foregoing objects are achieved as is now described. A method and system are disclosed for reducing perplexity in a speech recognition system based upon determined geographic location. In a mobile speech recognition system which processes input frames of speech against stored templates representing speech, a core library of speech templates is created and stored representing a basic vocabulary of speech. Multiple location-specific libraries of speech templates are also created and stored, each library containing speech templates representing a specialized vocabulary for a specific geographic location. The geographic location of the mobile speech recognition system is then periodically determined utilizing a cellular telephone system, a geopositioning satellite system or other similar systems and a particular one of the location-specific libraries of speech templates is identified for the current location of the system. Input frames of speech are then processed against the combination of the core library and the particular location-specific library to greatly enhance the efficiency of speech recognition by the system. Each location-specific library preferably includes speech templates representative of location place names, proper names, and business establishments within a specific geographic location.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
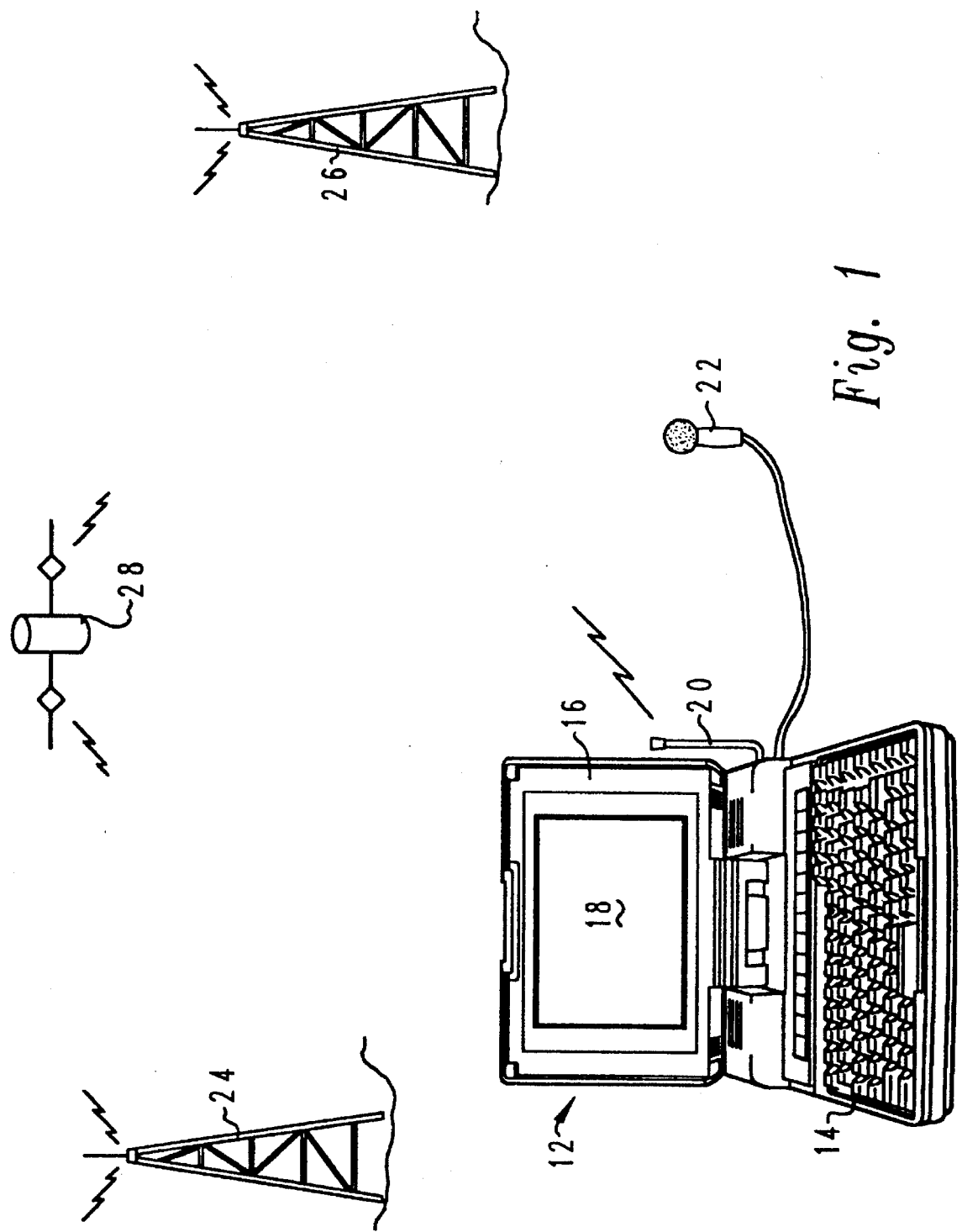
FIG. 1 is a pictorial representation of a mobile speech recognition system which may be utilized to implement the method and system of the present invention.

With reference now to the figures and in particular with reference to FIG. 1, there is depicted a pictorial representation of a mobile speech recognition system 12 which may be utilized to implement the method and system of the present invention. As illustrated, mobile speech recognition system 12 may be implemented utilizing any suitably programmed portable computer, such as a so-called "notebook computer." As depicted, mobile speech recognition system 12 may include a keyboard 14, a display 16 and a display screen 18. Additionally, as will be explained in greater detail herein, mobile speech recognition system 12 may also include an antenna 20 which may be utilized to electronically determine the specific geographic location of mobile speech recognition system 12 in response to detection of a verbal utterance.

Also depicted within FIG. 1 is an audio input device which is coupled to mobile speech recognition system 12. Microphone 22 serves as an audio input device for mobile speech recognition system 12 and, in a manner well known to those having ordinary skill in the speech recognition art, may be utilized to capture verbal utterances spoken by a user of mobile speech recognition system 12, in order to provide additional information, perform specific functions or otherwise respond to verbal commands.

Mobile speech recognition system 12 is characterized as mobile within this specification and it is anticipated that such systems will find application within mobile platforms, such as automobiles, police cars, fire trucks, ambulances, and personal digital assistant (PDAs) which may be carried on the person of a user. Upon reference to this disclosure, those ordinarily skilled in the art will appreciate that speech recognition on a mobile platform represents a definite increase in the likely perplexity of the speech recognition problem due to the necessity that the system recognize street names, street addresses, restaurant names, business names and other proper names associated with a specific geographic location at which the mobile system may be located.

In order to solve this problem mobile speech recognition system 12 preferably includes a device for determining the geographic location of the system. This may be accomplished utilizing many different techniques including the utilization of a geopositioning system, such as the Global Positioning Satellite System. Thus, radio signals from satellite 28 may be received at mobile speech recognition system 12 at antenna 20 and may be utilized to determine the specific geographic location for mobile speech recognition system 12 at the time of a particular spoken utterance. Similarly, radio signals from a cellular phone network, such as cellular transmission towers 24 and 26 may also be utilized to accurately and efficiently determine the geographic location of mobile speech recognition system 12. Additionally, while not illustrated, those ordinarily skilled in the art will appreciate that special purpose radio signals, inertial guidance systems, or other similar electronic measures may be utilized to determine the geographic location of mobile speech recognition system 12 in a manner that is well within the current scope of these technologies. Additionally, a user may simply enter an indication of geographic location into mobile speech recognition system 12 utilizing keyboard 14.

Figure 2:
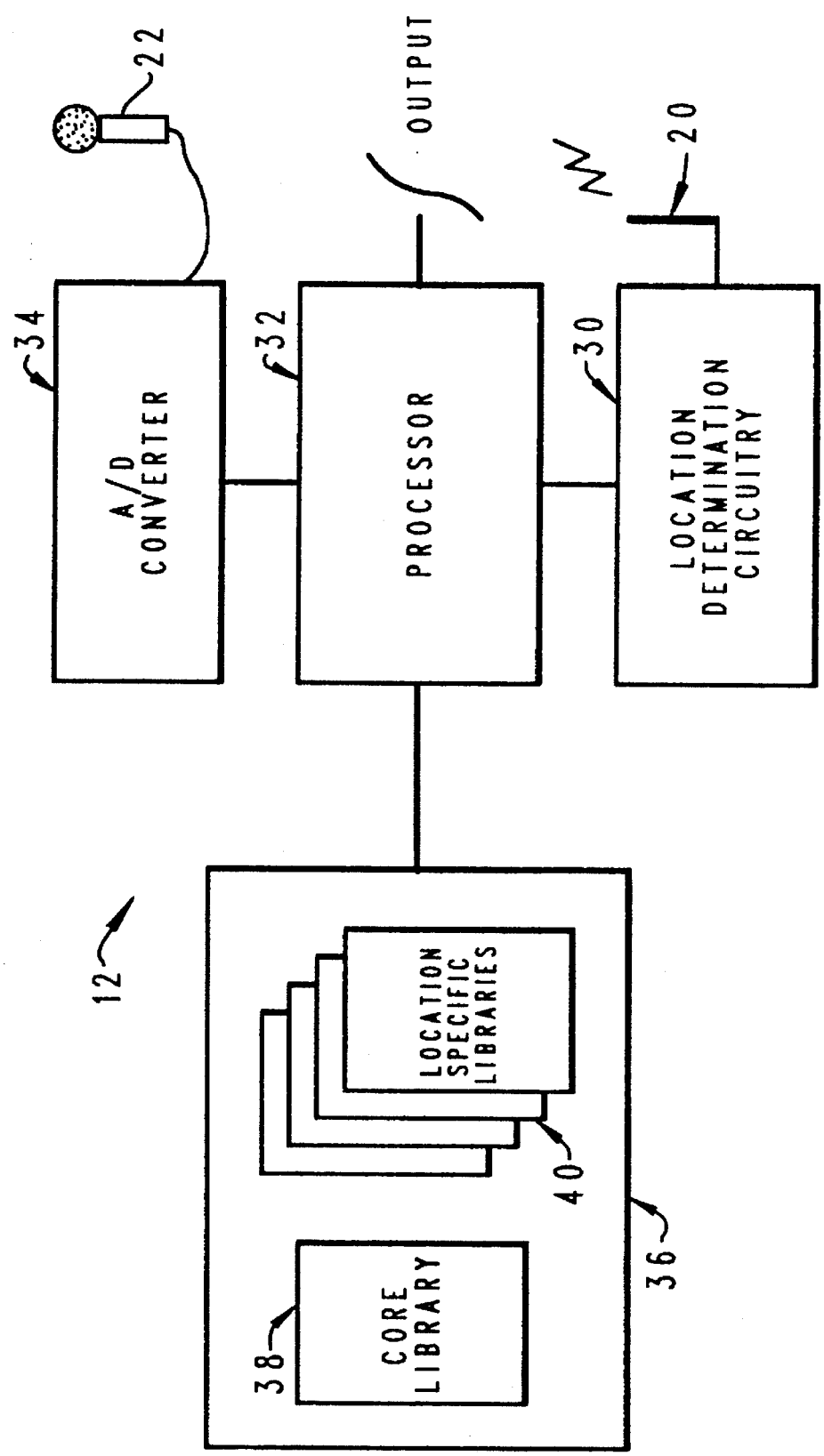
FIG. 2 is a high-level block diagram of the mobile speech recognition system of FIG. 1.

Referring now to FIG. 2, there is depicted a high level block diagram of the mobile speech recognition system 12 of FIG. 1, which illustrates the manner in which this geographic location determination may be utilized to decrease the perplexity of speech recognition. As illustrated within FIG. 2, a memory 36 is provided within mobile speech recognition system 12 which includes a core library 38 of speech templates which represent a basic vocabulary of speech. Similarly, multiple location-specific libraries 40 are also stored within memory 36. Each location-specific library 40 includes templates which are representative of a specialized vocabulary for a particular geographic location. For example, each location-specific library of speech templates may include a series of speech templates representative of street names within that geographic location, business establishments within that geographic location or other proper names which are germane to a selected geographic location.

Thus, each time a speech utterance is detected at microphone 22, that utterance may be suitably converted for processing utilizing analog-to-digital converter 34 and coupled to processor 32. Processor 32 then utilizes location determination circuitry 30 to identify a specific geographic location for mobile speech recognition system 12 at the time of the spoken utterance. This may be accomplished, as described above, utilizing global positioning satellite systems or radio frequency signals from cellular telephone systems which are received at antenna 20, or by the simple expedient of requiring the user to periodically enter at keyboard 14 an identification for a specific geographic location.

Next, the output of location determination circuitry 30 is utilized by processor 32 to select a particular one of the multiple location-specific libraries 40 contained within memory 36. The input frame of speech data is then compared to a composite library which is comprised of core library 38 and a particular one of the location-specific libraries 40. In this manner, the perplexity of speech recognition in a mobile speech recognition system may be greatly reduced, thereby enhancing the accuracy and efficiency of speech recognition within the system.

As discussed above with respect to previous attempts at speech recognition, the templates against which input speech is processed may comprise templates representing individual words, phrases or portions of words. As utilized herein, the term "template" shall mean any stored digital representation which may be utilized by processor 32 to identify an unknown speech utterance.

Figure 3:
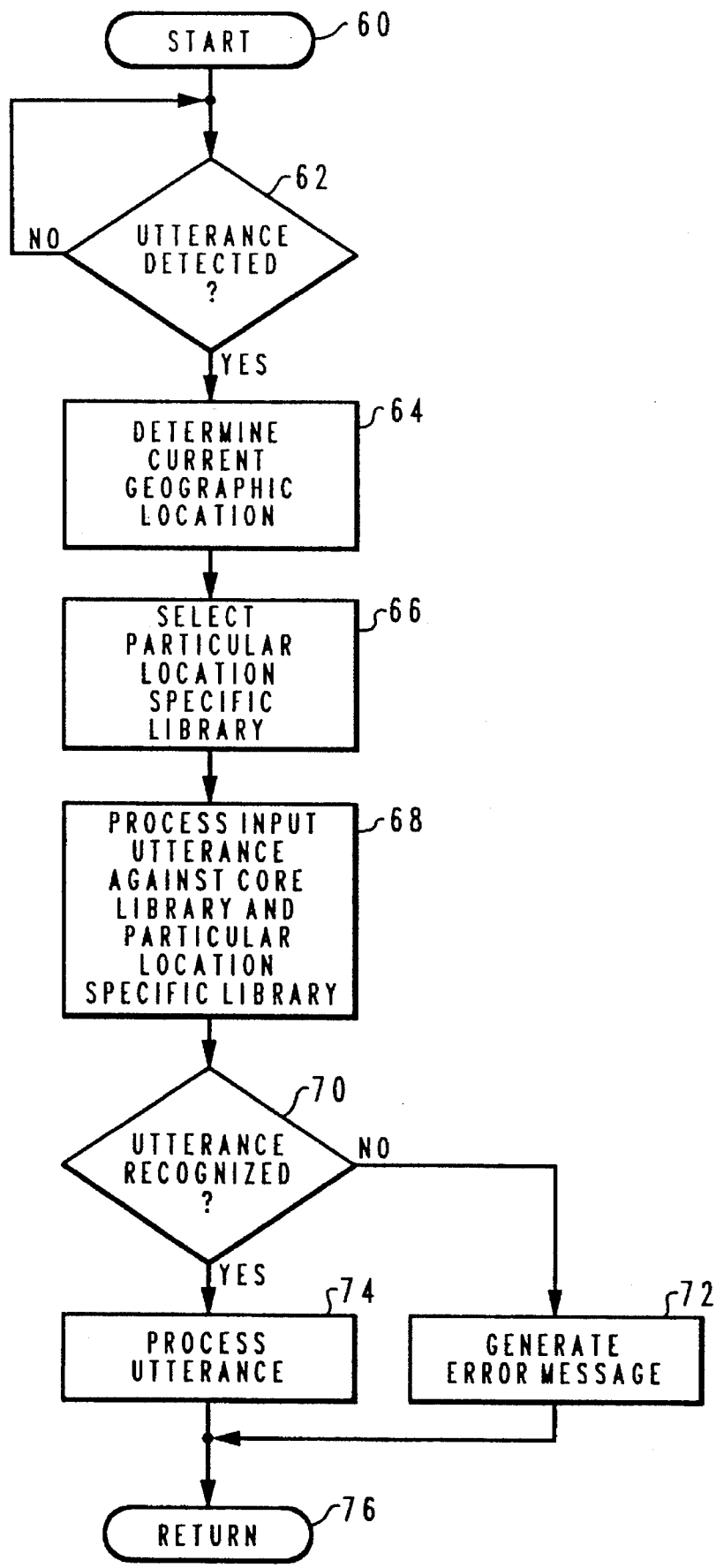
FIG. 3 is a high-level logic flowchart illustrating a process for implementing the method of the present invention.

Finally, with reference to FIG. 3, there is depicted a high-level logic flowchart which illustrates a process for implementing the method of the present invention. As depicted, this process begins at block 60 and thereafter passes to block 62. Block 62 illustrates a determination of whether or not a verbal utterance has been detected. If not, the process merely iterates until such time as an utterance has been detected. However, once a verbal utterance has been detected, the process passes to block 64.

Block 64 illustrates a determination of the current geographic location of mobile speech recognition system 12. As discussed above, this may be accomplished utilizing the global positioning satellite system, cellular telephone systems, or other specialized radio frequency signals or inertial navigation techniques. Thereafter, the geographic location determination is utilized to select a particular location-specific library, as depicted at block 66.

Next, as depicted at block 68, the input utterance is processed against the core library of basic vocabulary words and a particular location-specific library which is associated with the determined geographic location of mobile speech recognition system 12. Thereafter, the process passes to block 70. Block 70 illustrates a determination of whether or not the verbal utterance has been recognized. If not, the process passes to block 72 which depicts the generation of an error message, a verbalized command urging the user to repeat the utterance, or other similar techniques for resolving the failure of the system to recognize the verbal utterance. After generating such a message, the process then passes to block 76 and returns to await the detection of a subsequent verbal utterance.

Referring again to block 70, in the event the utterance has been recognized, the process passes to block 74. Block 74 illustrates the processing of that utterance. Those skilled in the art will appreciate that a verbal utterance may be processed to generate information which is presented to the user, to control the activity of some portion of the system or to store data for future reference. Thereafter, as above, the process passes to block 76 and returns to await the detection of a subsequent verbal utterance.

Upon reference to the foregoing, those skilled in the art will appreciate that by determining the geographic location of a mobile speech recognition system and thereafter utilizing a location-specific library of speech templates, the method and system of the present invention greatly reduces the possible perplexity of a speech recognition system and concomitantly enhances the accuracy and efficiency of speech recognition.

While the invention has been particularly shown and described with reference to a preferred embodiment, it will be understood by those skilled in the art that various changes in form and detail may be made therein without departing from the spirit and scope of the invention.

We claim:

1. A method for enhancing the efficiency of a mobile speech recognition system which processes input frames of speech against stored templates representing speech, said method comprising the steps of:

creating and storing a core library of speech templates representing a basic vocabulary of speech;

creating and storing a plurality of location-specific libraries of speech templates, each representing a specialized vocabulary for a particular geographic location;

determining a geographic location of said mobile speech recognition system;

combining said core library of speech templates with a particular one of said plurality of location-specific libraries of speech templates in response to said determination of said geographic location of said mobile speech recognition system; and processing input frames of speech against said combined core library and location-specific library.

2. The method for enhancing the efficiency of a mobile speech recognition system according to claim 1, wherein said step of determining a geographic location of said mobile speech recognition system comprises the step of utilizing a cellular telephone system to determine a geographic location of said mobile speech recognition system.

3. The method for enhancing the efficiency of a mobile speech recognition system according to claim 1, wherein said step of determining a geographic location of said mobile speech recognition system comprises the step of utilizing a geopositioning satellite system receiver to determine a geographic location of said mobile speech recognition system.

4. A mobile speech recognition system comprising:

an audio input means for receiving input speech;

memory;

a core library of speech templates stored within said memory representing a basic vocabulary of speech;

a plurality of location-specific libraries of speech templates stored within said memory, each representing a specialized vocabulary for a particular geographic location;

location determination means for determining a geographic location of said mobile speech recognition system;

library selection means coupled to said memory and said location determination means for selecting a particular one of said plurality of location-specific libraries in response to a determination of said geographic location of said mobile speech recognition system; and speech processor means coupled to said audio input means and said memory for processing input speech frames against said core library and said particular one of said plurality of location-specific libraries wherein efficiency of speech recognition is enhanced.

5. The mobile speech recognition system according to claim 4, wherein said audio input means comprises a microphone.

6. The mobile speech recognition system according to claim 4, wherein said location determination means comprises a cellular telephone transceiver.

7. The mobile speech recognition system according to claim 4, wherein said location determination means comprises a global positioning satellite receiver.

8. The mobile speech recognition system according to claim 4, wherein said speech processor means includes an analog-to-digital converter.

9. The mobile speech recognition system according to claim 8, wherein said speech processor means comprises a personal computer.

10. The mobile speech recognition system according to claim 4, wherein each of said plurality of location-specific libraries of speech templates comprises a plurality of templates each representative of a plurality of location place names.

* * * * *